United States Patent
Sun et al.

(10) Patent No.: US 12,440,428 B2
(45) Date of Patent: Oct. 14, 2025

(54) ORAL CARE CLEANING TABLET

(71) Applicant: Guangzhou Joyson Cleaning Products Co., Ltd., Guangdong (CN)

(72) Inventors: Jianfeng Sun, Guangdong (CN); Fenglei Li, Guangdong (CN); Min Sun, Guangdong (CN); Xiangjian Zeng, Guangdong (CN); Na Lan, Guangdong (CN); Yumei Huang, Guangdong (CN)

(73) Assignee: Guangzhou Joyson Cleaning Products Co., Ltd., Guangdong (CN)

( * ) Notice: Subject to any disclaimer, the term of this patent is extended or adjusted under 35 U.S.C. 154(b) by 321 days.

(21) Appl. No.: 18/235,118

(22) Filed: Aug. 17, 2023

(65) Prior Publication Data
US 2024/0033191 A1   Feb. 1, 2024

Related U.S. Application Data

(63) Continuation of application No. PCT/CN2023/106965, filed on Jul. 12, 2023.

(30) Foreign Application Priority Data

Jul. 28, 2022   (CN) .................... 202210904196.1

(51) Int. Cl.
| | |
|---|---|
| A61K 8/02 | (2006.01) |
| A61K 8/43 | (2006.01) |
| A61K 8/49 | (2006.01) |
| A61K 8/60 | (2006.01) |
| A61K 8/73 | (2006.01) |
| A61Q 11/00 | (2006.01) |

(52) U.S. Cl.
CPC .............. *A61K 8/0216* (2013.01); *A61K 8/43* (2013.01); *A61K 8/4926* (2013.01); *A61K 8/602* (2013.01); *A61K 8/732* (2013.01); *A61Q 11/00* (2013.01)

(58) Field of Classification Search
None
See application file for complete search history.

(56) References Cited

U.S. PATENT DOCUMENTS

| | | |
|---|---|---|
| 2021/0261885 A1 | 8/2021 | Tibbs et al. |
| 2021/0401705 A1 | 12/2021 | Li et al. |

FOREIGN PATENT DOCUMENTS

| | | |
|---|---|---|
| CN | 101185613 A | 5/2008 |
| CN | 104473822 A | 4/2015 |
| CN | 106963702 A | 7/2017 |
| CN | 108030705 A | 5/2018 |
| CN | 110354023 A | 10/2019 |
| CN | 113136273 A | 7/2021 |
| CN | 113599303 A | 11/2021 |
| CN | 115282076 A | 11/2022 |
| JP | 2019116460 A | 7/2019 |

OTHER PUBLICATIONS

International Search Report and Written Opinion of Corresponding Application No. PCT/CN2023/106965; Sep. 20, 2023; 8 Pgs.
Office Action received in corresponding European patent application No. 23751841.0, dated Oct. 2, 2024, 9 pages.
Supplementary European Search Report received in corresponding European patent application No. 23751841.0, dated Sep. 20, 2024, 4 pages.

*Primary Examiner* — Walter E Webb
(74) *Attorney, Agent, or Firm* — Cooper Legal Group, LLC

(57) ABSTRACT

The present application discloses an oral care cleaning tablet, and relates to the technical field of an oral care product, wherein the oral care cleaning tablet 1. is made of the following raw materials by weight percentage: 8-25% of a film-forming agent, 15-40% of a surfactant, 10-30% of an washing-friction modifier, 1-5% of a cosolvent, 0.5-3% of a water softener, 0.01-1% antibacterial agent, 1-5% of moisturizing agent, 0.1-1% of a sweetener, 0-3% of a breath freshener, 0-1% pH regulator, 0-0.5% of an essence, and balance of water; wherein the surfactant includes any one or two of an alcohol ether glycosides and a C8-C18 alkyl glycosides; and the washing-friction modifier includes a plant starch.

14 Claims, No Drawings

ORAL CARE CLEANING TABLET

CROSS-REFERENCE TO RELATED APPLICATION

This application is a continuation of PCT application serial no. PCT/CN2023/106965, filed on Jul. 12, 2023, which claims the priority and benefit of Chinese patent application serial no. 202210904196.1, filed on Jul. 28, 2022. The entireties of PCT application serial no. PCT/CN2023/106965 and Chinese patent application serial no. 202210904196.1 are hereby incorporated by reference herein and made a part of this specification.

TECHNICAL FIELD

The present application relates to the technical field of an oral care product, and particularly to an oral care cleaning tablet.

BACKGROUND ART

Oral care and cleaning are indispensable in people's daily life. Currently, oral care and cleaning product for people includes a toothpaste, a xylitol gum, a mouthwash, and the like.

In particular, the toothpaste includes main components such as a friction modifier, a moisturizing agent, a sweetener, and a surfactant. However, the friction modifier of the toothpaste generally is selected from inorganic salts such as calcium carbonate, calcium phosphate, aluminum hydroxide, in which calcium carbonate is most commonly used. In order to improve a detergency of the toothpaste to the teeth, the friction modifier is generally used in an amount of 20-60%. However, tooth enamel on teeth surface is easy to be damaged due to a large amount of calcium carbonate added. In addition, an anionic surfactant is commonly used as a surfactant in the toothpaste, however, the anionic surfactant has large irritation effect to the oral mucosa.

An principle of xylitol gum for oral cleaning is that when the xylitol gum is chewed by the teeth, saliva secretion can be promoted. Bacteria in the oral cavity and teeth can be washed by the secreted saliva, which can slow down a decrease of pH value in the oral cavity and inhibit adsorption of the bacteria on the teeth surface at the same time, so as to reduce acid corrosion of teeth, prevent dental caries and reduce dental plaque. However, since the chewed xylitol gum has strong viscosity, the gum spitted or discarded haphazardly may have a certain impact on hygiene in daily life.

The mouthwash is composed of water, organic solvent, a suitable amount of sweetener, and a small amount of antibacterial cationic surfactant in general. Easily-removed food residue in the oral cavity is spat out by gargling, and harmful bacteria in the oral cavity may be inhibited at the same time. However, the mouthwash has low active ingredient, and is commonly contained in plastic or glass bottles, which has problems of incomplete cleaning or inconvenient carrying.

Therefore, there is a need for an oral care product that has advantages of being environmentally friendly, strong cleaning effect, low irritation to the oral mucosa and little damage to the teeth and convenient carrying.

SUMMARY

In order to solve problem that current toothpaste has a large irritant effect and is easy to damage teeth, a gum is easy to pollute the environment and a mouthwash has a weak cleaning effect, and inconvenience carrying, the present application provides an oral care cleaning tablet, a preparation method and an application method thereof, and the oral care cleaning tablet has advantages of being environmentally friendly, strong cleaning effect, low irritation to the oral mucosa, little damage to the teeth and convenient carrying.

In a first aspect, the present application provides an oral care cleaning tablet, adopting the following technical solution:

the oral care cleaning tablet is made of the following raw materials by weight percentage:
8-25% of a film-forming agent, 15-40% of a surfactant, 10-30% of an washing-friction modifier, 1-5% of a cosolvent, 0.5-3% of a water softener, 0.01-1% antibacterial agent, 1-5% of moisturizing agent, 0.1-1% of a sweetener, 0-3% of a breath freshener, 0-1% pH regulator, 0-0.5% of an essence, and balance of water;
wherein the surfactant includes any one or two of an alcohol ether glycosides and a C8-C18 alkyl glycosides; and the washing-friction modifier includes a plant starch.

In the above technical solution, the film-forming agent acts as a carrier for an active ingredient of the oral care cleaning tablet, which is conductive to improve the packaging simplicity and the convenience of carrying of the oral care cleaning tablet.

An alkyl glycosides and an alcohol ether glycosides from plant sources, having low irritation, are adopted as surfactant, which has advantages of non-toxic, harmless, low irritation and rapid biodegradation, and is conductive to decrease the irritant effect to the oral mucosa by the oral care cleaning tablet. In particular, the C8-C18 alkyl glycosides have strong wettability, strong detergency and compatibility.

The washing-friction modifier is added to remove stubborn dirt on the teeth or in a crevice between teeth. And the washing-friction modifier cooperates with the surfactant to further improve the detergency of the oral care cleaning tablet. In particular, the washing-friction modifier is selected from a biodegradable plant starch, so as to reduce mining of inorganic salt friction modifiers, and further reduce resource waste. In addition, a large amount of inorganic salt friction modifiers are replaced by the plant starch, which is conductive to decrease damage of the washing-friction modifier to the tooth enamel on the teeth surface, thereby reducing the risk of teeth damage.

On one hand, the cosolvent is able to improve the dissolving property of the active ingredient and the like in the oral care cleaning tablet, and has a certain dissolving effect to common stains, which is conductive to improve the detergency of the oral care cleaning tablet. On the other hand, the cosolvent is conductive to a uniform dispersion of the washing-friction modifier, which can improve the quality of the oral care cleaning tablet and ensure the detergency of each oral care cleaning tablet.

Calcium and magnesium ions in the water can be chelated by the water softener, so as to decrease the impact of calcium and magnesium ions on the detergency of the surfactant, which is conductive to maximize the detergency of surfactants.

The antibacterial agent can improve an antibacterial property of a formula system of the oral care cleaning tablet, which is truly conductive to play antibacterial and cleaning roles.

Combination of the surfactant of plant sources with low irritation, biodegradable washing-friction modifier of plant sources with low irritation, the cosolvent, the water softener and the antibacterial agent can effectively improve the detergency of the oral care cleaning tablet and is conductive to reduce breeding of harmful bacteria in oral cavity, thereby preventing oral diseases.

In an embodiment, the surfactant includes a C8-C18 alkyl glycosides, an alcohol ether glycosides and sucrose stearate ester, and a mass ratio of the C8-C18 alkyl glycosides, the alcohol ether glycosides and sucrose stearate is 1:0.5:(0.1-0.5).

In the above technical solution, combination of the C8-C18 alkyl glycosides, alcohol ether glycosides and sucrose stearate in above proportion is used as the surfactant, which is conductive to increase content of the active ingredient in the formula system of the oral care cleaning tablet, and property of the formula system, and further improve the detergency of the oral care cleaning tablet and the antibacterial property of the antibacterial agent.

In an embodiment, the plant starch is one or more selected from the group consisting of cereal starch, legume starch, and tuber starch; the cereal starch is one or more selected from the group consisting of corn starch, wheat starch, and sorghum starch; the legume starch is any one or two of mung bean powder starch and pea starch; and the tuber starch is one or more selected from the group consisting of potato starch, sweet potato starch, cassava starch.

In an embodiment, the plant starch is the cereal starch.

In the above technical solution, a pleasant and comfortable feeling can be generated in the oral cavity since the cereal starch has a certain sweetness. In addition, the amount of the sweetener in the formula system can be reduced by adding low-priced cereal starch, so as to decrease a risk of causing dental caries, and cost of the product.

In an embodiment, the washing-friction modifier includes a legume starch, a cereal starch and silica, and a mass ratio of the legume starch, the cereal starch and silica is (3-5):(3-5):1.

In an embodiment, an edible silica is used.

In the above technical solution, a small amount of silica is mixed with the cereal starch and the legume starch, and the amount of silica added can be controlled to prevent the tooth enamel on the teeth from being damaged. In addition, a small amount of silica added can improve the friction value of the oral care cleaning tablet to some extent, and is conductive to improve decontamination efficiency and decontamination effect of the oral care cleaning tablet to tartar.

In an embodiment, the antibacterial agent is a cationic type heat resistant antibacterial agent; and the cationic type heat resistant antibacterial agent is one or more selected from the group consisting of chlorhexidine gluconate, cetylpyridinium chloride, and polyhexamethylene biguanidine hydrochloride.

In the above technical solution, the cationic type heat resistant antibacterial agent would not lose activity due to high temperature, so that the cationic type heat resistant antibacterial agent can still exert good bacteriostatic effect after high-temperature treatment. In addition, the oral care cleaning tablet in the present application adopts nonionic surfactant such as alkyl glycosides and alcohol ether glycosides and the like, from plant sources that has low irritation, which helps the active ingredients in the cationic antibacterial agent to maximize the bacteriostatic effect, decrease the using amount of the cationic type heat resistant antibacterial agent in formula components, and further decrease toxicity of cationic active ingredient in the formula system of the oral care cleaning tablet, and reduce the cost at the same time, and reduce adverse effect on the human body caused by accidental swallowing.

In an embodiment, the antibacterial agent includes chlorhexidine gluconate and cetylpyridinium chloride, and a mass ratio of the chlorhexidine gluconate and the cetylpyridinium chloride is 1:(1-1.5).

In the above technical solution, combination of the chlorhexidine gluconate and the cetylpyridinium chloride in above proportion is used as the antibacterial agent, which is conductive to further improve the antibacterial effect of the oral care cleaning tablet.

In an embodiment, the film-forming agent is a polyvinyl alcohol with an average degree of polymerization of 500-2500 and an average molecular weight of 20000-120000.

In the above technical solution, the film-forming agent is a polyvinyl alcohol with an average degree of polymerization of 500-2500 and an average molecular weight of 20000-120000, which is conductive to increase the disintegration time of the oral care cleaning tablet.

In an embodiment, the cosolvent is one or more selected from selected from the group consisting of glycerin, propylene glycol and butanediol.

In the above technical solution, glycerin, propylene glycol or butanediol can dissolve a plurality of organic and inorganic substances, has a certain dissolving effect to common stains, has synergism with surfactant components in removing stains, and has good moisturizing properties at the same time.

In an embodiment, the moisturizing agent is one or more selected from the group consisting of sorbitol, glycerol, propylene glycol and butanediol.

In an embodiment, the moisturizing agent is edible grade sorbitol, and the edible grade sorbitol is prepared by conducting a hydrogenation reaction on glucose under catalysis of nickel catalyst.

In the above technical solution, the edible grade sorbitol is harmless to human body, and solves a problem that the oral care cleaning tablet is easy to dehydrate and crack after long-term storage. Moreover, the edible grade sorbitol has a moisturizing effect, and is conductive to increase sweetness of the oral care cleaning tablet, so as to reduce the using amount of the sweetener, thereby further decreasing the risk of causing dental caries.

In an embodiment, the sweetener is acesulfame potassium.

In the above technical solution, acesulfame potassium is non-cariogenic and has good thermal stability and acid stability.

In an embodiment, the water softener is one or more selected from the group consisting of tetrasodium glutamate diacetate, sodium citrate, tetrasodium iminodisuccinate, polyaspartic acid and sodium polyepoxysuccinate.

In an embodiment, the water softener is sodium citrate.

In the above technical solution, sodium citrate has good softening effect to divalent metal ion such as calcium ion, magnesium ion from water, and can cooperate with surfactant components to improve detergency. Sodium citrate is edible, which is conductive to reduce the adverse effect on the human body caused by accidental swallowing.

In an embodiment, the breath freshener is menthol.

In the above technical solution, the menthol, extracted from leaves and stems of mint, has fresh fragrance, and helps to alleviate halitosis.

In an embodiment, the pH regulator is sodium bicarbonate.

In the above technical solution, adding sodium bicarbonate into the oral care cleaning tablet is conductive to maintain weak alkalinity in the oral cavity when in use, and the acidic substances generated by bacterial fermentation in the oral cavity is neutralized to maintain acid-base balance in the oral cavity, so that a healthy oral cavity environment can be obtained, thereby yellowing of teeth and halitosis can be effectively alleviated.

In an embodiment, the essence is edible essence or daily essence.

In the above technical solution, adding a small amount of essence into the oral care cleaning tablet can give the oral care cleaning tablet fresh fragrance on one hand, and the essence is cooperated with the breath freshener to bring pleasant comfort to the oral cavity to refresh oneself on the other hand.

In a second aspect, the present application provides a preparation method for the oral care cleaning tablet adopting the following technical solution:

the preparation method for the oral care cleaning tablet includes the following steps:

step one, adding the film-forming agent into the water, heating to 80-90° C., and swelling to obtain a carrier;

step two, adding the water softener, the cosolvent, the moisturizing agent, the breath freshener and the essence into the carrier under stirring to obtain a mixture A;

step three, adding the surfactant into the mixture A under stirring to obtain a mixture B;

step four, adding the washing-friction modifier, the pH regulator and the sweetener into the mixture B under stirring to obtain a mixture C;

step five, adding the antibacterial agent into the mixture C under stirring to obtain a slurry of the oral care cleaning tablet; and step six, drying the slurry of the oral care cleaning tablet, forming a tablet, and slicing to obtain the oral care cleaning tablet.

In an embodiment, in step one, the swelling is performed for 30±5 min. In step two, the stirring is performed at a speed of 100±20 r/min for 15±5 min. In step three, the stirring is performed at a speed of 100±20 r/min for 15±5 min. In step four, the stirring is performed at a speed of 1000±100 r/min for 30±5 min. In step five, the stirring is performed at a speed of 100±20 r/min for 15±5 min.

In the above technical solution, the carrier is prepared by the film-forming agent at a temperature controlled at 80-90° C. The slurry of the oral care cleaning tablet can be controlled at a temperature of 45-65° C., and a viscosity of the slurry of the oral care cleaning tablet is controlled at 10000 mPa·s-35000 mPa·s, which is conductive to forming a tablet.

In a third aspect, the present application provides an application method for the oral care cleaning tablet adopting the following technical solution:

the application method for the oral care cleaning tablet includes putting the oral care cleaning tablet on a toothbrush wetted by water, or putting the oral care cleaning tablet wetted by water on the toothbrush, and brushing teeth; or directly putting the oral care cleaning tablet into mouth, and gargling.

In the above technical solution, the oral care cleaning tablet prepared in the present application can be used conveniently.

In summary, the oral care cleaning tablet prepared in the present application has at least one of the following beneficial technical effects:

(1) the oral care cleaning tablet is environmentally friendly, has strong cleaning effect, low irritation to the oral mucosa and little damage to the teeth and carry convenience; and (2) the antibacterial agent has a small addition amount and good antibacterial effect.

DETAILED DESCRIPTION

The present application will be further described in detail below in combination with examples and comparative examples.

EXAMPLES

Raw materials of the oral care cleaning tablets in Examples 1-4 are shown in table 1:

TABLE 1

| Raw materials of the oral care cleaning tablets in Examples 1-4 (wt %) | | | | |
|---|---|---|---|---|
| Raw material | Example 1 | Example 2 | Example 3 | Example 4 |
| Film-forming agent | 8% | 15% | 18% | 25% |
| Surfactant | 25% | 40% | 16% | 15% |
| Washing-friction modifier | 30% | 10% | 28% | 20% |
| Cosolvent | 5% | 3% | 3% | 1% |
| Water softener | 1.5% | 0.5% | 2.5% | 3% |
| Antibacterial agent | 0.1% | 0.5% | 0.01% | 1% |
| Moisturizing agent | 1% | 3% | 4% | 5% |
| Sweetener | 1% | 0.7% | 0.5% | 0.1% |
| Water | 28.4% | 27.3% | 27.99% | 29.9% |

In particular, in Example 1, the film-forming agent included 6% of polyvinyl alcohol and 2% of polyvinyl pyrrolidone K60; and the polyvinyl alcohol had a model of BP-26, an average degree of polymerization of 2500-2650, and an average molecular weight of 124000-130000. In Examples 2-4, the film-forming agent were all polyvinyl alcohol, and the polyvinyl alcohol had a model of BP-05, an average degree of polymerization of 550-650, and an average molecular weight of 27000-32000.

In Examples 1-4, C12-C14 alkyl glycosides were used as the surfactant.

The washing-friction modifier in Example 1 was pea starch. The washing-friction modifier in Example 2 was corn starch. The washing-friction modifier in Example 3 included 14% of pea starch and 14% of corn starch. The washing-friction modifier in Example 4 included 10% of pea starch and 10% of corn starch.

The cosolvent in Examples 1-4 was glycerol.

The water softener in Examples 1-4 was sodium citrate.

The antibacterial agents in Examples 1-4 was chlorhexidine gluconate.

The moisturizing agent in Examples 1-4 was edible grade sorbitol.

The sweetener in Examples 1-4 was acesulfame potassium.

Preparation methods for the oral care cleaning tablet in Examples 1-4 included the following steps:
- step one, adding the film-forming agent into the water under stirring, heating to 85° C., and swelling for 30 min to obtain a carrier;
- step two, adding the water softener, the cosolvent, the moisturizing agent, the breath freshener and the essence into the carrier under stirring at a speed of 100 r/min for 15 min to obtain a mixture A;
- step three, adding the surfactant into the mixture A under stirring at a speed of 100 r/min for 15 min to obtain a mixture B;
- step four, adding the washing-friction modifier, the pH regulator and the sweetener into the mixture B under stirring at a speed of 1000 r/min for 30 min to obtain a mixture C;
- step five, adding the antibacterial agent into the mixture C under stirring at a speed of 100 r/min for 15 min to obtain a slurry of the oral care cleaning tablet; and
- step six, drying the slurry of the oral care cleaning tablet, forming a tablet, and slicing to obtain the oral care cleaning tablet.

Example 5

The oral care cleaning tablet of this example is same as that of Example 3 except that:
the surfactant included 0.5% of C12-C14 alkyl glycosides, 7.5% of alcohol ether glycoside and 8% of sucrose stearate.

Example 6

The oral care cleaning tablet of this example is same as that of Example 3 except that:
the surfactant included 10% of C12-C14 alkyl glycosides, 5% of alcohol ether glycoside and 1% of sucrose stearate.

Example 7

The oral care cleaning tablet of this example is same as that of Example 3 except that:
the surfactant included 8% of C12-C14 alkyl glycosides, 4% of alcohol ether glycoside and 4% of sucrose stearate.

Example 8

The oral care cleaning tablet of this example is same as that of Example 7 except that:
the washing-friction modifier included 12% of pea starch, 12% of corn starch and 4% of edible silica.

Example 9

The oral care cleaning tablet of this example is same as that of Example 7 except that:
the washing-friction modifier included 10.5% of pea starch, 14% of corn starch and 3.5% of edible silica.

Example 10

The oral care cleaning tablet of this example is same as that of Example 8 except that:
the antibacterial agent was cetylpyridinium chloride.

Example 11

The oral care cleaning tablet of this example is same as that of Example 8 except that:
the antibacterial agent included 0.005% of chlorhexidine gluconate and 0.005% of cetylpyridinium chloride.

Example 12

The oral care cleaning tablet of this example is same as that of Example 8 except that:
the antibacterial agent included 0.004% of chlorhexidine gluconate and 0.006% of cetylpyridinium chloride.

Example 13

The oral care cleaning tablet of this example is same as that of Example 11 except that:
the surfactant was C12-C14 alkyl glycosides.

Example 14

The oral care cleaning tablet of this example is same as that of Example 11 except that:
the surfactant was alcohol ether glycoside.

Example 15

The oral care cleaning tablet of this example is same as that of Example 11 except that:
the surfactant was sucrose stearate.

Example 16

The oral care cleaning tablet of this example is same as that of Example 11 except that:
the film-forming agent was polyvinyl alcohol with an average degree of polymerization of 1700-1800 and an average molecular weight of 84000-89000.

Example 17

The oral care cleaning tablet of this example is same as that of Example 11 except that:
the film-forming agent was polyvinyl alcohol with the average degree of polymerization of 2500-2650 and the average molecular weight of 124000-130000.

Example 18

The oral care cleaning tablet of this example is same as that of Example 11 except that:
3% of breath freshener, 1% of pH regulator, 0.5% of essence were added, and the amount of water was adjusted as 23.4%. In particular, the breath freshener was menthol, the pH regulator was sodium bicarbonate, and the essence was osmanthus essence.

Comparative Examples

Comparative Example 1

The oral care cleaning tablet of this example is same as that of Example 3 except that:
the surfactant was sodium lauryl sulfate.

Comparative Example 2

The oral care cleaning tablet of this example is same as that of Example 3 except that:
the washing-friction modifier was replaced by equal amount of water.

Comparative Example 3

The oral care cleaning tablet of this example is same as that of Example 3 except that:
the cosolvent was replaced by equal amount of water.

Comparative Example 4

The oral care cleaning tablet of this example is same as that of Example 3 except that:
the water softener was replaced by equal amount of water.

Performance Test (1) Disintegration test: 5 sample tablets with similar weight and size in examples and comparative examples were added into screen meshes, respectively, the screen mesh containing a sample tablet was put into water at a temperature of 25° C. to test a period taken for the sample tablet to be completely disintegrated. In particular, the whole sample tablet passing through the screen mesh was regarded as being completely disintegrated. The test data were shown in table 2.

(2) Detergency test: tooth specimens with similar dirt components and staining degree were taken to test using amounts of each oral care cleaning tablet, aiming at a cleaning brightness of 1.2 g toothpaste. In particular, for each oral care cleaning tablet, a series of sample tablets with a gradient of 0.1 g were provided, in which the series of sample tablets have a smallest mass of 0.1 g and a largest mass of 3.0 g. During testing process, in order to ensure a same brushing force for each of the tooth specimens, an electric toothbrush was adopted, and each of the tooth specimens were brushed for a same period. The test data were shown in table 3.

(3) Antibacterial effect test: the oral care cleaning tablet in each example and comparative example was prepared as a solution with a mass concentration of 1%, then antibacterial effect of above solution of the oral care cleaning tablet on *Staphylococcus aureus* (D1), *Streptococcus mutans* (D2), oral *streptococcus* (D3) and *Escherichia coli* (D4) were tested, and shown in table 4.

Performance Test Data

TABLE 2

Disintegration time of the oral care cleaning tablets in Examples 1-18 and Comparative examples 1-4

| Sample | Example 1 | Example 2 | Example 3 | Example 4 | Example 5 |
|---|---|---|---|---|---|
| Disintegration time/s | 15.92 | 14.54 | 13.25 | 20.56 | 13.45 |

| Sample | Example 6 | Example 7 | Example 8 | Example 9 | Example 10 |
|---|---|---|---|---|---|
| Disintegration time/s | 13.28 | 13.12 | 13.33 | 13.41 | 13.29 |

| Sample | Example 11 | Example 12 | Example 13 | Example 14 | Example 15 |
|---|---|---|---|---|---|
| Disintegration time/s | 13.19 | 13.25 | 13.41 | 13.38 | 13.24 |

| Sample | Example 16 | Example 17 | Example 18 | Comparative example 1 | Comparative example 2 |
|---|---|---|---|---|---|
| Disintegration time/s | 13.12 | 17.49 | 13.29 | 13.21 | 13.46 |

| Sample | Comparative example 3 | Comparative example 4 |
|---|---|---|
| Disintegration time/s | 13.34 | 13.17 |

As can be seen from table 1 that, the disintegration times of the oral care cleaning tablets in the present application are all less than 30 s, which is conductive to play a cleaning role. In particular, comparing Example 11 with Example 7, as can be seen that, when the average degree of polymerization of the polyvinyl alcohol is greater than 2500 and the average molecular weight thereof is greater than 120000, the disintegration times of the oral care cleaning tablets are increased. In addition, when the average degree of polymerization of the polyvinyl alcohol is greater than or equal to 500 and the average molecular weight thereof is greater than or equal to 20000, the oral care cleaning tablet is easy to be formed. Therefore, the average degree of polymerization of the polyvinyl alcohol between 500 and 2500 and the average molecular weight of the polyvinyl alcohol between 20000 and 120000 are preferred.

TABLE 3

Detergency of the oral care cleaning tablets in Examples 1-18 and Comparative examples 1-4

| Sample | Example 1 | Example 2 | Example 3 | Example 4 | Example 5 |
|---|---|---|---|---|---|
| Oral care cleaning tablet/g | 1.2 | 1.0 | 1.0 | 1.1 | 1.2 |

| Sample | Example 6 | Example 7 | Example 8 | Example 9 | Example 10 |
|---|---|---|---|---|---|
| Oral care cleaning tablet/g | 0.8 | 0.8 | 0.4 | 0.5 | 0.4 |

| Sample | Example 11 | Example 12 | Example 13 | Example 14 | Example 15 |
|---|---|---|---|---|---|
| Oral care cleaning tablet/g | 0.4 | 0.4 | 0.4 | 0.4 | 0.4 |

| Sample | Example 16 | Example 17 | Example 18 | Comparative Example 1 | Comparative Example 2 |
|---|---|---|---|---|---|
| Oral care cleaning tablet/g | 0.4 | 0.4 | 0.4 | 0.9 | 1.6 |

| Sample | Comparative Example 3 | Comparative Example 4 |
|---|---|---|
| Oral care cleaning tablet/g | 1.4 | 2.5 |

Comparing Example 3 with Comparative example 1 and combining with the test data in table 2, as can be seen that, the oral care cleaning tablet adopting sodium lauryl sulfate as the surfactant has a similar detergency with the oral care cleaning tablet adopting alkyl glycoside as the surfactant.

Comparing Example 3 with Comparative examples 2-4, and combining with the test data in table 2, as can be seen that, when the cosolvent or the water softener was replaced by equal amount of water, the detergency is decreased.

Comparing Example 3 with Comparative examples 5-7, and combining with the test data in table 2, as can be seen that, when the surfactant is a combination of C8-C18 alkyl glycosides, alcohol ether glycosides and sucrose stearate in a weight ratio of 1:0.5:(0.1-0.5), the detergency of the oral care cleaning tablet is improved.

Comparing Example 7 with Comparative examples 8-9, and combining with the test data in table 2, as can be seen that, the detergency of the oral care cleaning tablet can be further improved by adding a small amount of silica into legume starch and cereal starch. In particular, the using amount of the silica should not exceed 6% (wt) due to the damage to tooth enamel of the teeth.

TABLE 4

Antibacterial effect of the oral care cleaning tablets in Examples 1-18 and Comparative examples 1-4

| Items | Example 1 | Example 2 | Example 3 | Example 4 | Example 5 |
|---|---|---|---|---|---|
| Antibacterial rate of $D_1$/% | 97.82 | 98.43 | 95.44 | 99.87 | 92.54 |
| Antibacterial rate of $D_2$/% | 88.45 | 90.12 | 82.26 | 91.56 | 81.37 |
| Antibacterial rate of $D_3$/% | 85.39 | 87.46 | 80.38 | 88.69 | 80.24 |
| Antibacterial rate of $D_4$/% | 96.79 | 97.64 | 94.16 | 98.95 | 91.68 |

| Items | Example 6 | Example 7 | Example 8 | Example 9 | Example 10 |
|---|---|---|---|---|---|
| Antibacterial rate of $D_1$/% | 99.32 | 99.56 | 99.48 | 99.69 | 99.15 |
| Antibacterial rate of $D_2$/% | 86.36 | 86.69 | 86.39 | 86.58 | 85.42 |
| Antibacterial rate of $D_3$/% | 85.49 | 85.54 | 85.42 | 85.38 | 84.16 |
| Antibacterial rate of $D_4$/% | 99.16 | 99.24 | 99.19 | 99.32 | 98.94 |

TABLE 4-continued

Antibacterial effect of the oral care cleaning tablets
in Examples 1-18 and Comparative examples 1-4

| Items | Example 11 | Example 12 | Example 13 | Example 14 | Example 15 |
|---|---|---|---|---|---|
| Antibacterial rate of $D_1$/% | 99.92 | 99.89 | 98.16 | 98.23 | 98.29 |
| Antibacterial rate of $D_2$/% | 92.32 | 92.43 | 86.69 | 86.42 | 86.73 |
| Antibacterial rate of $D_3$/% | 91.03 | 91.12 | 85.36 | 85.24 | 85.47 |
| Antibacterial rate of $D_4$/% | 99.78 | 99.83 | 97.25 | 97.16 | 97.22 |

| Items | Example 16 | Example 17 | Example 18 | Comparative Example 1 | Comparative Example 2 |
|---|---|---|---|---|---|
| Antibacterial rate of $D_1$/% | 99.94 | 99.89 | 99.77 | 70.23 | 93.44 |
| Antibacterial rate of $D_2$/% | 92.41 | 92.26 | 92.54 | 59.34 | 81.62 |
| Antibacterial rate of $D_3$/% | 91.24 | 91.02 | 91.33 | 58.43 | 80.18 |
| Antibacterial rate of $D_4$/% | 99.89 | 99.77 | 99.68 | 69.94 | 92.61 |

| Items | Comparative Example 3 | Comparative Example 4 |
|---|---|---|
| Antibacterial rate of $D_1$/% | 95.21 | 95.48 |
| Antibacterial rate of $D_2$/% | 82.06 | 82.49 |
| Antibacterial rate of $D_3$/% | 80.14 | 80.27 |
| Antibacterial rate of $D_4$/% | 94.02 | 94.22 |

Comparing Example 3 with Comparative example 1, and combining with the test data in table 3, as can be seen that, when the surfactant is sodium lauryl sulfate, the antibacterial effects of the oral care cleaning tablet on *Staphylococcus aureus* (D1), *Streptococcus mutans* (D2), oral *streptococcus* (D3) and *Escherichia coli* (D4) are obviously decreased. The reason is that, sodium lauryl sulfate is a anionic surfactant, and is easy to adsorb and precipitate with cationic antibacterial agents that have antibacterial properties, so that the antibacterial agents cannot effectively exert the antibacterial effect.

Comparing Example 3 with Examples 5-7, and combining with the test data in table 3, as can be seen that, when combination of C8-C18 alkyl glycosides, alcohol ether glycosides and sucrose stearate in a weight ratio of 1:0.5:(0.1-0.5), the antibacterial effects of the oral care cleaning tablet on *Staphylococcus aureus* (D1), *Streptococcus mutans* (D2), oral *streptococcus* (D3) and *Escherichia coli* (D4) are increased at the same time.

Comparing Example 8 with Examples 10-15, and combining with the test data in table 3, as can be seen that, when the surfactant is a mixture of C8-C18 alkyl glycosides, alcohol ether glycosides and sucrose stearate in a weight ratio of 1:0.5:(0.1-0.5), the antibacterial agent is a mixture of chlorhexidine gluconate and the cetylpyridinium chloride in a weight ratio of 1:(1-1.5), and the using amount of the antibacterial agent is 0.01% (wt), the antibacterial rates of *Staphylococcus aureus* (D1), *Streptococcus mutans* (D2), oral *streptococcus* (D3) and *Escherichia coli* (D4) all can exceed 90%, which is conductive to reduce adverse effect on the human body caused by accidental swallowing as well.

The above are the preferred embodiments of the present application, which are not intended to limit the protection scope of the present application. Therefore, all equivalent changes made according to the structure, shape and principle of the present application should fall within the protection scope of the present application.

What is claimed is:

1. An oral care cleaning tablet, wherein, the oral care cleaning tablet is made of the following raw materials by weight percentage:
   8-25% of a film-forming agent, 15-40% of a surfactant, 10-30% of a washing-friction modifier, 1-5% of a cosolvent, 0.5-3% of a water softener, 0.01-1% of an antibacterial agent, 1-5% of a moisturizing agent, 0.1-1% of a sweetener, 0-3% of a breath freshener, 0-1% of a pH regulator, 0-0.5% of an essence, and balance of water;
   wherein the surfactant comprises any one or two of an alcohol ether glycoside and a C8-C18 alkyl glycoside; and the washing-friction modifier comprises a plant starch.

2. The oral care cleaning tablet according to claim 1, wherein, the surfactant comprises the C8-C18 alkyl glycoside, the alcohol ether glycoside and sucrose stearate ester, and a mass ratio of the C8-C18 alkyl glycoside, the alcohol ether glycoside and the sucrose stearate ester is 1:0.5:(0.1-0.5).

3. The oral care cleaning tablet according to claim 1, wherein, the plant starch is one or more selected from the group consisting of cereal starch, legume starch, and tuber starch; the cereal starch is one or more selected from the group consisting of corn starch, wheat starch, and sorghum starch; the legume starch is any one or two of mung bean powder starch and pea starch; and the tuber starch is one or more selected from the group consisting of potato starch, sweet potato starch, and cassava starch.

4. The oral care cleaning tablet according to claim 1, wherein, the washing-friction modifier comprises a legume starch, a cereal starch and silica, and a mass ratio of the legume starch, the cereal starch and the silica is (3-5):(3-5):1.

5. The oral care cleaning tablet according to claim 1, wherein, the antibacterial agent is a cationic type heat resistant antibacterial agent; and the cationic type heat resistant antibacterial agent is one or more selected from the group consisting of chlorhexidine gluconate, cetylpyridinium chloride, and polyhexamethylene biguanidine hydrochloride.

6. The oral care cleaning tablet according to claim 5, wherein, the antibacterial agent comprises the chlorhexidine gluconate and the cetylpyridinium chloride, and a mass ratio of the chlorhexidine gluconate and the cetylpyridinium chloride is 1:(1-1.5).

7. The oral care cleaning tablet according to claim 1, wherein, the film-forming agent is a polyvinyl alcohol with an average degree of polymerization of 500-2500 and an average molecular weight of 20000-120000.

8. The oral care cleaning tablet according to claim 1, wherein, the cosolvent is one or more selected from the group consisting of glycerin, propylene glycol and butanediol.

9. The oral care cleaning tablet according to claim 1, wherein, the moisturizing agent is edible grade sorbitol, and the edible grade sorbitol is prepared by conducting a hydrogenation reaction on glucose under catalysis of nickel catalyst.

10. The oral care cleaning tablet according to claim 1, wherein, the sweetener is acesulfame potassium.

11. The oral care cleaning tablet according to claim 1, wherein, the water softener is one or more selected from the group consisting of tetrasodium glutamate diacetate, sodium citrate, tetrasodium iminodisuccinate, polyaspartic acid and sodium polyepoxysuccinate.

12. The oral care cleaning tablet according to claim 1, wherein, the breath freshener is menthol.

13. The oral care cleaning tablet according to claim 1, wherein, the pH regulator is sodium bicarbonate.

14. The oral care cleaning tablet according to claim 1, wherein, the essence is edible essence or daily essence.

\* \* \* \* \*